June 26, 1923.

Re. 15,637

I. C. JENNINGS

WET VACUUM PUMPING APPARATUS

Original Filed June 15, 1917 4 Sheets-Sheet 1

Inventor

Irving C. Jennings

By

Southgate & Southgate Attorneys

June 26, 1923.

Re. 15,637

I. C. JENNINGS

WET VACUUM PUMPING APPARATUS

Original Filed June 15, 1917

4 Sheets-Sheet 2

Inventor

Irving C. Jennings

By

Southgate & Southgate Attorneys

June 26, 1923.

Re. 15,637

I. C. JENNINGS

WET VACUUM PUMPING APPARATUS

Original Filed June 15, 1917

4 Sheets-Sheet 3

Inventor

Irving C. Jennings

By Southgate & Southgate Attorneys

June 26, 1923.

Re. 15,637

I. C. JENNINGS

WET VACUUM PUMPING APPARATUS

Original Filed June 15, 1917

4 Sheets-Sheet 4

Inventor

Irving C. Jennings

By

Southgate & Southgate Attorneys

Reissued June 26, 1923. Re. 15,637

UNITED STATES PATENT OFFICE.

IRVING C. JENNINGS, OF SOUTH NORWALK, CONNECTICUT, ASSIGNOR TO NASH ENGINEERING COMPANY, OF SOUTH NORWALK, CONNECTICUT, A CORPORATION OF CONNECTICUT.

WET VACUUM PUMPING APPARATUS.

Original No. 1,447,854, dated March 6, 1923, Serial No. 774,953, filed June 15, 1917. Application for reissue filed May 15, 1923. Serial No. 639,189.

*To all whom it may concern:*

Be it known that I, IRVING C. JENNINGS, a citizen of the United States, residing at South Norwalk, county of Fairfield, and State of Connecticut, have invented certain new and useful Improvements in Wet Vacuum Pumping Apparatus, of which the following is a specification.

This invention relates to a wet vacuum pumping apparatus. The object of the invention is to provide an apparatus in which the air and water are separated and the air exhausted by means of a pump and delivered into the atmosphere, the water being withdrawn by a separate pump and discharged against any desired pressure. Automatic means may be provided whereby the operation of the pumps is controlled according to the vacuum or the quantity of water returned or by both. Other objects and features of the invention will be apparent from the description taken in connection with the drawings in which.

Briefly stated my apparatus comprises a receiver into which the returns of air and water are discharged, the water collecting in the bottom and the air in the upper portion of the receiver. A pumping unit is provided which comprises a centrifugal water pump and a hydro-turbine air pump. The latter is connected to exhaust the air and discharge the same where desired. The water pump is connected to the lower portion of the receiver and withdraws the water from the latter and discharges it where desired. Means is provided whereby the operation of the water pump is controlled by the quantity of water in the receiver and the operation of the air pump is controlled by the air pressure in the receiver. Thus if the quantity of water in the receiver exceeds a certain amount the water pump will be started and will operate to pump out the water from the receiver until the quantity therein has been reduced to a predetermined amount. Likewise if the air pressure within the receiver exceeds a predetermined amount the air pump will be set in operation to thereby exhaust the air and reduce the pressure to a desired amount.

I have shown an embodiment of my apparatus which is particularly adapted for vacuum steam heating service having a direct return system. In this system air and other non-condensable gases must be removed from the piping in order to maintain a vacuum and at the same time the hot condensate must be freed from air and delivered to the steam boiler. Although an apparatus of this type has been described it will be apparent that the apparatus is adapted for any service where it is required that both air and water either hot or cold must be handled under a vacuum.

Figure 1:
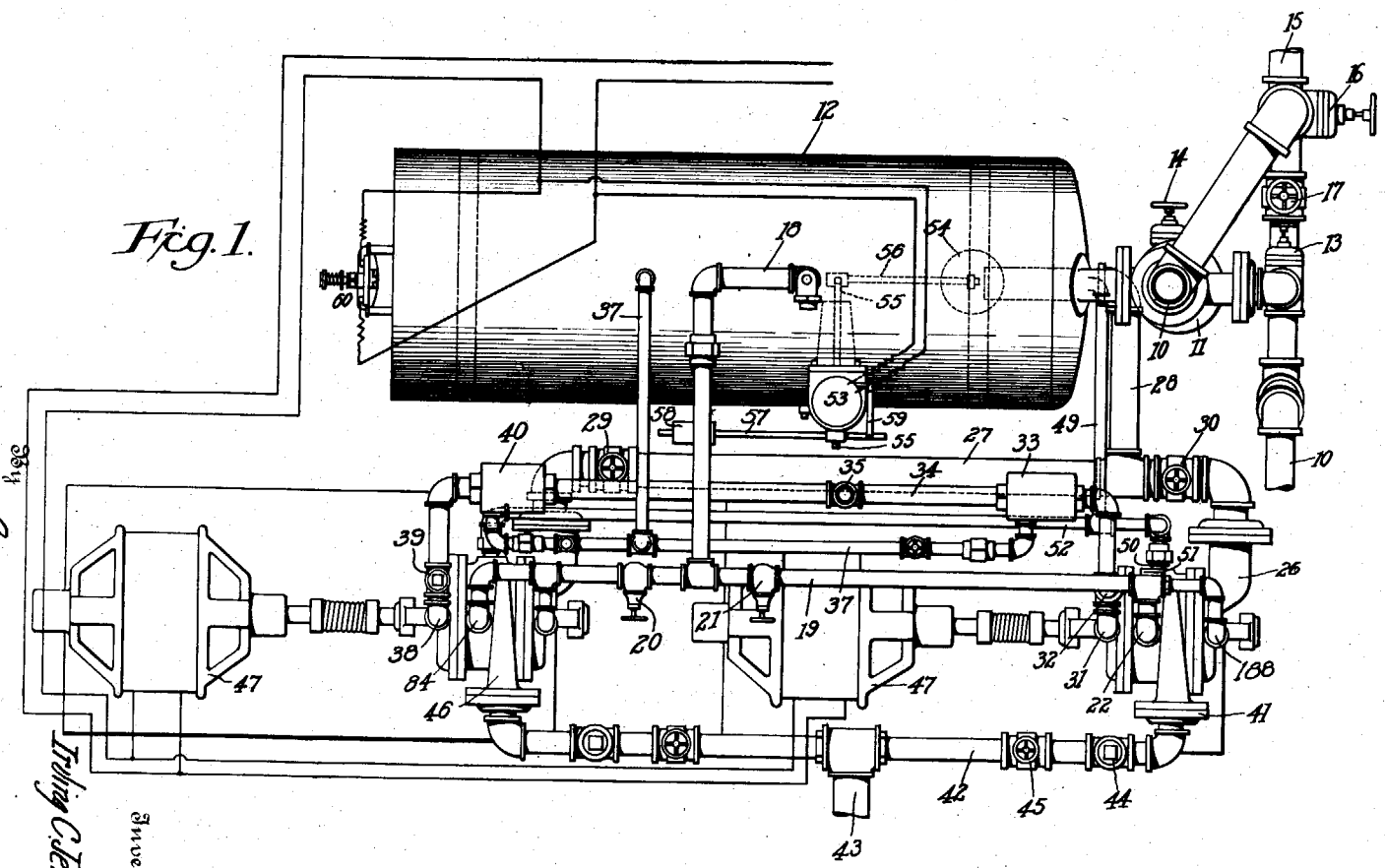
Fig. 1 is a plan view of one embodiment of my apparatus.
Figures 2, 9:
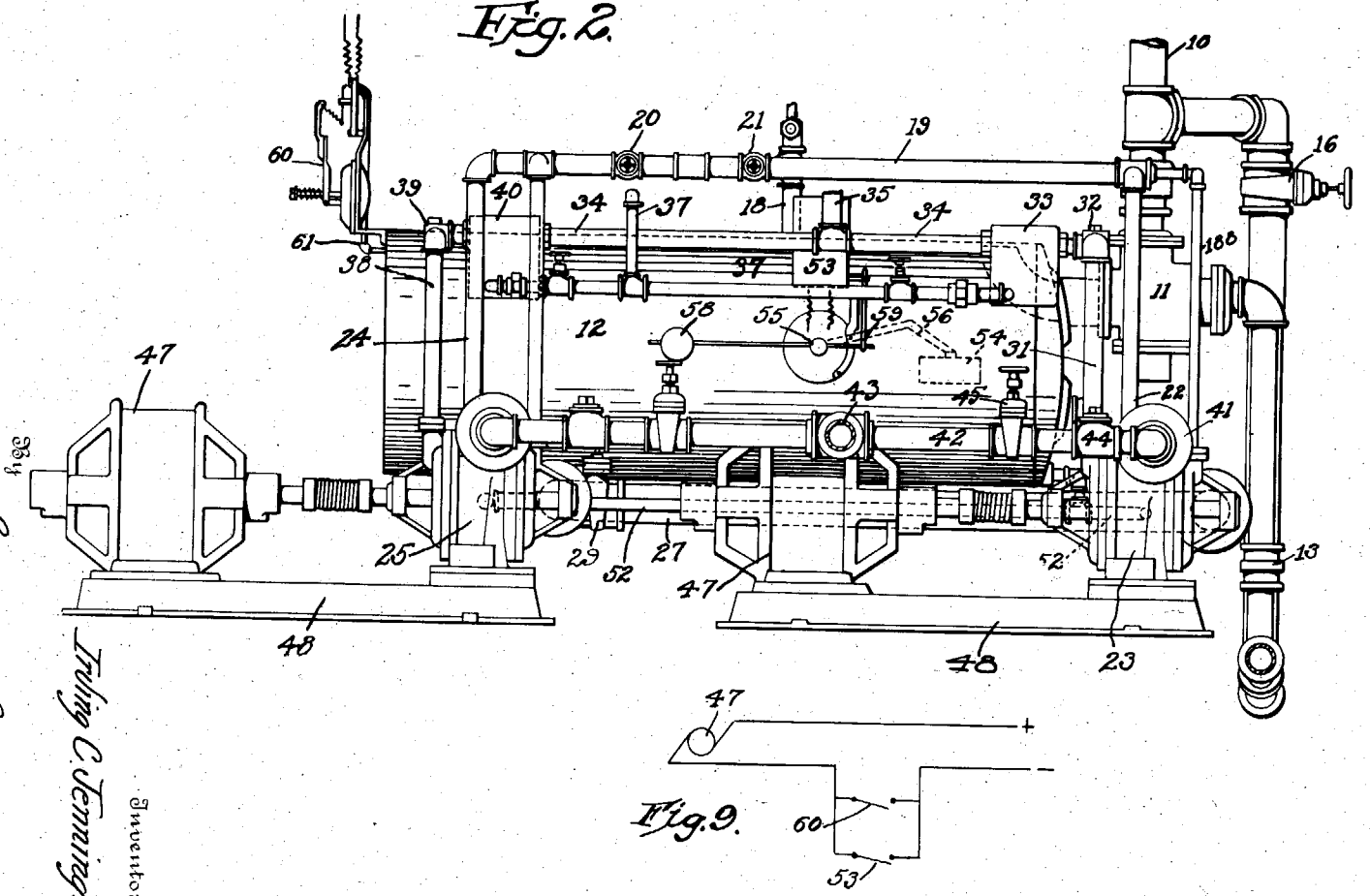
Fig. 2 is a side elevation of the apparatus shown in Fig. 1.
Fig. 9 is a diagrammatic view illustrating the electric circuit having the motor and the float operated and pressure operated switches therein.

Referring to the drawings, the returns 10 from the heating system are connected so as to discharge through a strainer 11 into the upper portion of the receiver or tank 12. Either or both of these returns may be used, the flow in the same being controlled by the valves 13 and 14. In case it is not desired to use the apparatus, the returns may be discharged into a connection 15 to the sewer, the flow into this latter pipe being controlled by the valves 16 and 16′. The tank 12 which may be mounted on a support or base 17 is provided at the top thereof with an air outlet pipe 18 which is connected to a header 19. As shown this header extends parallel with the tank and at each side of the T which connects the pipe 18 and the header is provided with valves 20 and 21. The right hand end of the header 19 as viewed in Figs. 1 and 2, is joined to a riser 22 which connects with the air inlet of the air pump of the pumping unit 23. The other end of the header 19 connects with a riser 24 which at its lower end is connected to the air inlet of the air pump of another pumping unit 25.

I have shown an apparatus provided with two independent pumping units so connected with the receiver that either or both of the units may be operated. As these units are duplicates of one another it will suffice to describe one of them, and this will be done more in detail hereinafter.

The water inlet 26 of the water pump of the unit 23 is connected to a header 27, which in turn is connected by means of a pipe 28 with one end of the receiver at a slight distance above the bottom thereof, whereby a certain quantity of water is always present in the receiver. The header 27 is also connected with the water inlet of the water pump of the unit 25, the valves 29 and 30 being provided in the header to control the flow of water to the different pumping units.

The air from the air pump of unit 23 is discharged through a riser 31, a check valve 32, through a separator 33 into a header 34 which discharges into the atmosphere through the outlet 35. The separator 33 is provided for the purpose of collecting any water which may be in the air discharged from the pump and returning the water thus collected into the receiver. In order to automatically return this water into the receiver the separator 33 is provided with a float controlled valve 36 through which the water passes from the separator 33 into the line 37 leading to the receiver. It will be apparent that when sufficient water has collected in the receiver 33 to raise the float that the valve 36 will be opened and as the pressure in the discharge line of the pump is greater than that within the receiver, the water will be forced through the valve 36 and line 37 into the tank 12. The valve 32 is provided to prevent the return or influx of air when the air pump is not in operation. The pumping unit 25 discharges the air from the air pump through a riser 38, a check valve 39 and separator 40 into the header 34.

The water pump of the unit 23 discharges through the outlet 41 into a header 42 which by means of a pipe 43 may be connected to the steam boiler. A check valve 44 is provided in this line to prevent the return of water into the pump and a stop valve 45 is arranged in the header between the check valve 44 and the pipe 43. The outlet 46 of the pumping unit 25 is connected in a like manner with the pipe 43 leading to the boiler. The pumping unit 23 is adapted to be driven through a direct connection by means of a motor 47 and the motor and pumping unit may be mounted on a base 48 if desired. In a similar manner the pumping unit 25 is driven by a motor 47 and this latter motor and the pumping unit 25 may be mounted on a similar base 48.

Figure 8:
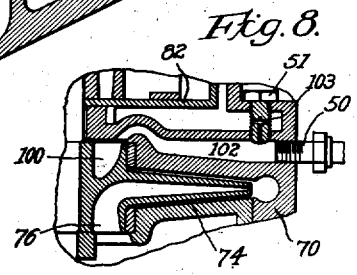
Fig. 8 is a sectional detail taken substantially on the line 8—8 of Fig. 6 illustrating the construction for relieving the impeller of the centrifugal pump from end thrust.

In the operation of the hydro-turbine air pump some water is entrained in the air and carried away with the air discharged from the pump. Consequently it is necessary to supply this air pump with a certain amount of make-up water. For this purpose, I have shown a pipe 49 which is connected to the tank 12 at a point below the connection of the pipe 28 which leads to the water pump. As the level of the water in the tank is always above the point of connection of the pipe 49, there will always be a supply of water for this pipe. The connection for the water feed to the air pump is shown at 50 and the size of opening of this connection is controlled by a plug 51, the connection 50 being joined to the header 52 which in turn is connected to the pipe 49. The other end of the header 52 is arranged to supply the air pump of the unit 25 with make-up water in the same manner as the unit 23. It will be obvious that the quantity of make-up water depends upon the size of the orifice 103 in the plug 51 (see Fig. 8). It will be noted that the head of water on the orifice 103 due to the level of the water in the receiver is substantially constant and consequently, a uniform supply of make-up water will be delivered to the air pump, irrespective of the pressure or vacuum maintained by the pump.

The operation of the pumps may be controlled by regulating switches 53 and 60 of conventional design. The switch 53 may be operated automatically to correspond with the quantity of water in the receiver. For this purpose the float 54 of the open bucket type is arranged within the receiver and arranged to rotate a rock shaft 55 through the arm 56, the rock shaft extending through the wall of the receiver, the end outside of the tank having mounted thereon a lever 57 having a weight 58 on one end thereof and the other end projecting to the opposite side of the rock shaft 55 and adapted to operate the switch 53 through the link 59. The arrangement is such that when the water within the receiver rises to a predetermined point the float 54 will lose sufficient weight so that the shaft 55 will be operated, thus starting the motor 47 and the pumping unit. The water will then be withdrawn from the receiver until the float 54 falls to a point where the switch 53 is again operated to cut off the supply of energy to the motor. Thus the operation of the water pump is controlled by the quantity of water in the receiver. In a similar manner the pressure of the air within the receiver or heating system may be used to control the operation of the air pump. For this purpose a diaphragm controlled switch 60 of conventional design may be connected with the air tank by means of a pipe 61 and the switch arranged to control the operation of the motor. When the air pressure within the tank exceeds a certain amount, the switch 60 will be thrown to supply the motor with energy, thus starting the air pump, which will continue to operate until the pressure has been reduced to such an amount that the diaphragm switch 60 will be thrown out, thereby cutting off the supply of energy to the motor. It is obvious that this means for controlling the air and water pumps may be worked at different times or simultaneously.

Figure 4:
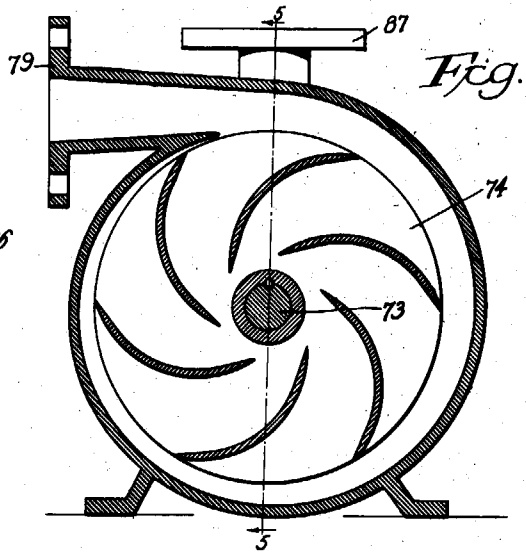
Fig. 4 is a sectional elevation through the centrifugal water pump taken substantially on the line 4—4 of Fig. 5.
Figure 5:
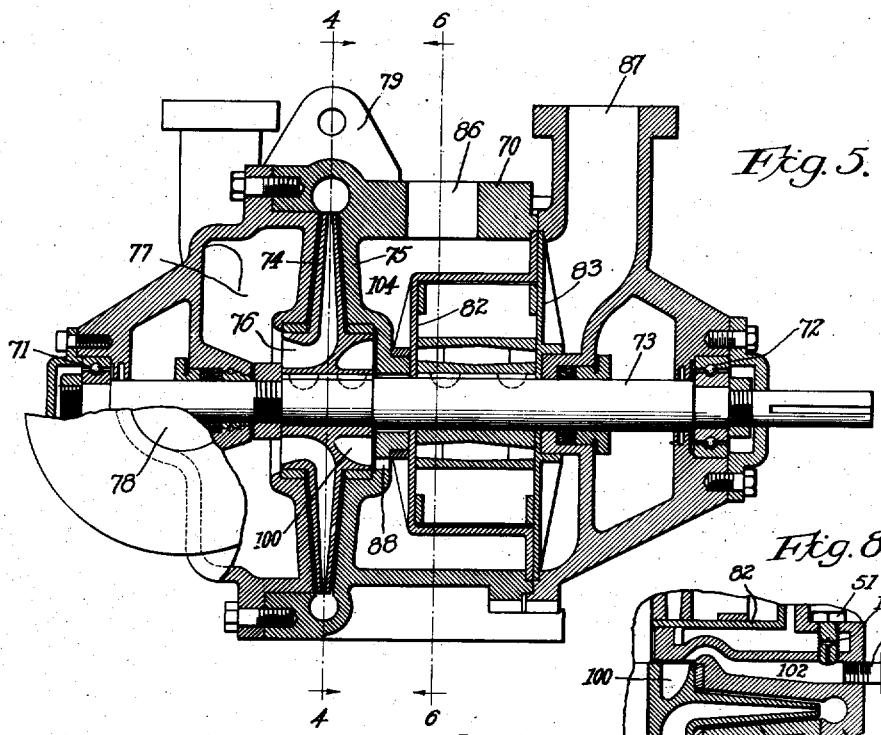
Fig. 5 is a longitudinal sectional view of the pumping unit taken substantially on the line 5—5 of Figs. 4 and 6.
Figure 6:
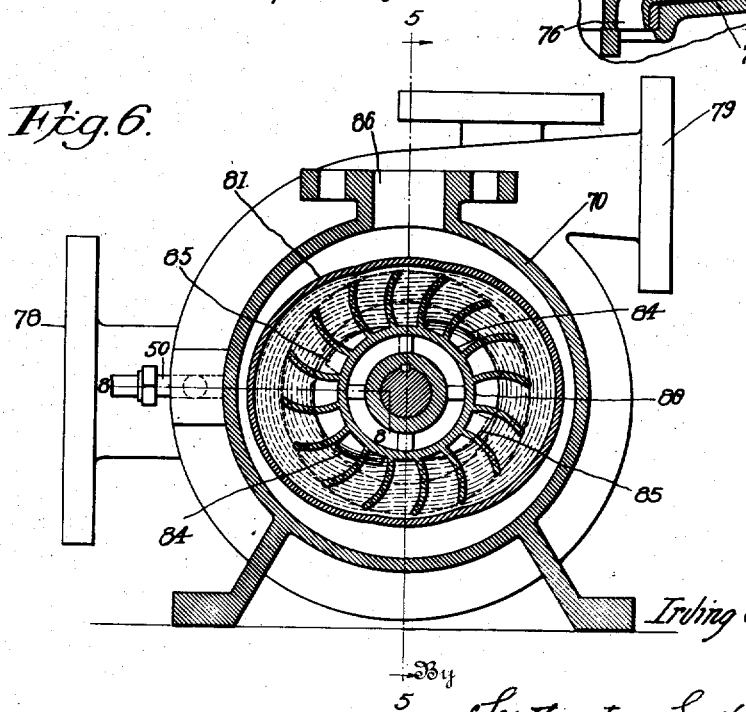
Fig. 6 is a sectional elevation of the hydro-turbine air pump taken substantially on the line 6—6 of Fig. 5.

I will now proceed to describe one of the pumping units. Referring to Figs. 4, 5 and 6, the pumps are housed within a casing 70, the air pump being arranged at the right and the water pump at the left thereof as viewed in Fig. 5. The casing 70 is provided at the ends thereof with the roller bearings 71 and 72 in which is supported the shaft 73, which carries the rotors for both the pumps. The impeller 74 of the water pump is mounted on the shaft in position to rotate within the water casing 75 and this impeller is provided with water inlet openings 76 which lead from the water inlet chamber 77 which is supplied through the pump inlet connection 78. The discharge from the water pump is shown at 79.

The rotor 80 of the air pump is provided with displacement chambers and is mounted on the shaft 73 with a sliding fit, the bearing 71 being arranged to take any end thrust that may come upon the shaft. This rotor 80 is arranged within an elliptical casing 81 carried within the main casing 70. The elliptical casing 81 is closed at the inlet side of the air pump by the side piece 82 and on the discharge side of the pump by the discharge piece 83. The side piece 82 is formed with two diametrically opposite inlet openings 84 and the side 83 is formed with two diametrically opposite outlet openings 85. As these latter openings would not appear in Fig. 6, they are shown dotted therein. The air for the air pump is fed through the inlet opening 86 formed in the casing 70 into the space 104 around the elliptical casing 81 and it then passes through the inlet opening 84 into the pump. This pump is supplied with water which when the rotor is rotated, due to the centrifugal force assumes the ring form shown in Fig. 6. Air fed in through the inlets 84 will thus fill the space between the blades of the rotor and the inside surface of the water. As the rotor rotates and approaches the outlet openings 85 this space will become smaller as the inside surface of the water approaches the hub of the rotor, thus forcing air out through the outlets 85 and into the discharge conduit 87.

It will thus be seen that the rotary gas or air pump employs water for its pumping action and that the said pump operates to exhaust the gas from the system by the suction and displacement action of the water in the displacement chambers of the rotor thereof.

It will be obvious in the operation of this air pump that the air will carry along with it some water and as previously stated it is necessary to supply this air pump with water to make up for that entrained in and carried off by the air. One means for doing this has already been described. In Fig. 5 another means for accomplishing this result is shown. The casing 75 of the water turbine pump is shown as formed with a port 88′ at one side of the hub of the impeller. Thus water which leaks by this hub will pass through the port 88′ and supply the air pump with the necessary make-up water. The hydro-turbine pump is described more in detail in Patent 1,091,529 granted March 31, 1914.

It will be observed that there is no stuffing box between the air pump and the water pump. This construction is made possible because of the pressure relief afforded by the pipe 49 leading to the receiver. Thus it is possible to do away with the objectionable stuffing box in the interior of the pumping unit. The construction for relieving the chamber 100 in the impeller, of pressure, and supplying the air pump with make-up water is shown in the detail view Fig. 8. The water is supplied from the receiver through pipe 49, header 52 and connection 50, this latter pipe communicating with conduit 102 formed in the interior wall of the centrifugal casing. This conduit has its inner end opening to chamber 100 in the impeller. Consequently any leakage which may flow to this chamber from the impeller blades is immediately relieved through the conduit 102. The make-up water for the air pump flows through orifice 103 in the plug 51 into the chamber 104 around the elliptical casing of the air pump, the orifice being made of the correct size to supply the proper quantity of water.

In the operation of my apparatus the first returns through the pipes 10 flow into the receiver 12 and the water flows through the pipe 49 to supply the air pump. When the level of water in the receiver rises above the entrance to pipe 28 water will flow into the centrifugal water pump and the air therein will be displaced, being driven out through the pipe 188 which is connected into the pipe 19. Thus when the switch 53 is operated by the float 54 the pumps will be started and the centrifugal water pump will immediately discharge water to supply the boiler and the air pump will operate to exhaust the air from the receiver, thus reducing the pressure within the latter. In case the water within the receiver is pumped out to the required level and the air pump continues to operate it will take practically no power to rotate the impeller of the centrifugal pump as no water is supplied to the latter and it thus becomes airbound. When the air within the receiver has been exhausted to the required reduced pressure, the diaphragm switch will be operated to throw off the supply of energy to the motor. Thus the pumps will cease to operate.

It is desirable to use a centrifugal water pump of such a size that it will have a capacity greater than the amount of liquid to be handled at any time. Thus the receiver whenever the pumps are operated will have the water removed therefrom quickly and promptly before the air has been exhausted to the desired pressure. Consequently the centrifugal pump although rotated will do no work and take but little power.

Figure 7:
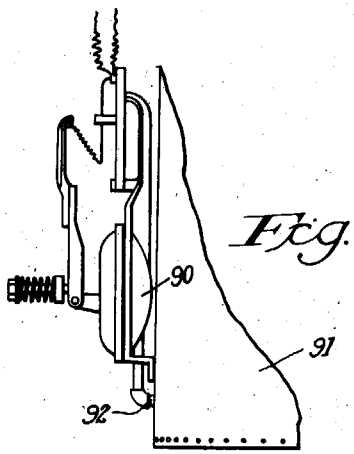
Fig. 7 is a view in elevation showing a modified arrangement of the means for controlling the operation of the pumps.
Figure 3:
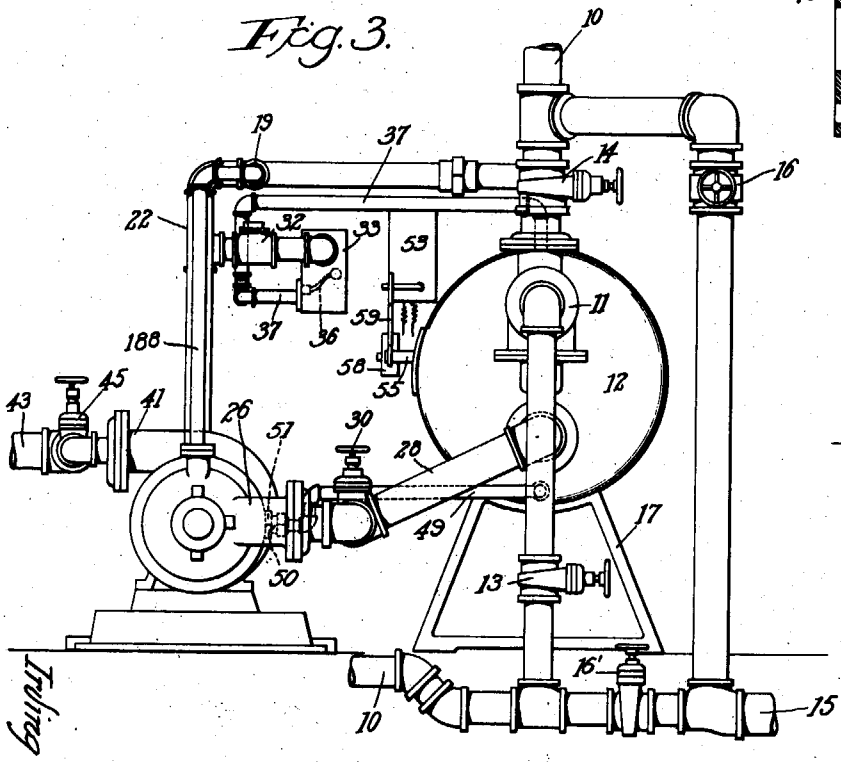
Fig. 3 is an end elevation of the parts shown in Fig. 1.

Fig. 7 shows another construction for automatically controlling the operation of the pumps. In this arrangement a single diaphragm switch 90 of conventional design is connected to the receiver or tank 91 near the bottom thereof by means of a pipe 92. Thus the action of the switch is controlled by the water or air pressure or both. For example, assume that the diaphragm is set to operate the switch and start the pump when the vacuum drops below 7 inches of mercury and stop the pump when the vacuum reaches 10 inches of mercury and further assume that the pump has just been stopped because the vacuum of 10 inches has been reached. Now while the vacuum remains at 10 inches the receiver begins to fill up with water. When approximately three feet of water has accumulated in the receiver 91, a pressure equal to three inches of mercury is produced at the diaphragm switch due to the height of water and in addition to the air pressure. The vacuum at the switch therefore is now 7 inches, which causes the switch to operate, thus starting the pump which continues to work until the water in the receiver has been reduced to the level of the pump intake pipe or until the combined water and air pressure is equivalent to 10 inches of mercury. It will thus be apparent that in this form of the controller the diaphragm switch takes the place of the bucket float controlling means and the diaphragm switch illustrated in connection with the previously described embodiment of the invention.

As the power consumption of the pumps is relatively small and as the centrifugal water pump is unloaded when not handling water, the automatic starter may be dispensed with if desired. In installations where a centrifugal pump has been used as a boiler feed pump, it has been found very often that when the boiler pressure exceeds the pressure against which the pump will discharge that the impeller will churn through the water without discharging it thereby heating and converting the water into steam which causes a back pressure in the feed line. Consequently turbine pumps as boiler feed pumps have not been successful. It will be observed that in connection with my apparatus that this condition of affairs can not happen as the centrifugal pump discharges into the boiler only the returns from the heating system and after the water in the receiver has been reduced to the required level the centrifugal pump becomes airbound and continues to rotate merely churning air instead of water. This is a very important feature of my apparatus and is one of the reasons why an automatic control may be dispensed with.

Having thus described the invention what is claimed and desired to be secured by Letters Patent is:—

1. A water and air pumping apparatus for use in a vacuum steam heating system comprising a receiver for air and water, a pump for withdrawing water from said receiver and a hydro-turbine pump for withdrawing air from said receiver, and means for supplying said latter pump with make-up water from water in the system.

2. The combination with the separating chamber of a vacuum steam heating system, of a rotary gas pump employing water for its pumping action and having a rotor provided with displacement chambers, said pump being connected and operating to exhaust the gas from the system by the suction and displacement action of the water in said chambers, and a water pump connected and operating to withdraw water of condensation from the separating chamber.

3. The combination with the separating chamber of a vacuum steam heating system, of a rotary gas pump employing water for its pumping action and having a rotor provided with displacement chambers, said pump being connected and operating to exhaust the gas from the system by the suction and displacement action of the water in said chambers and to retain all the water in the system, and a water pump connected and operating to circulate the water of condensation back to the boiler.

4. The combination with the separating chamber of a vacuum steam heating system, of a rotary gas pump employing water for its pumping action and having a rotor provided with displacement chambers, said pump being connected and operating to exhaust the gas from the system by the suction and displacement action of the water in said chambers, connections for supplying the gas pump with water for its operation from the system, and a water pump connected and operating to withdraw water of condensation from the chamber.

5. The combination with the separating chamber of a vacuum steam heating system, of a rotary gas pump connected to the chamber and employing water for its pumping action, and a water pump connected to and operating to withdraw the water of condensation from the separating chamber, the connection between the water pump and the separating chamber being at a higher level than the connection between the gas pump and the separating chamber, whereby the gas pump will contain its operating water and will continue in operation when the water pump has exhausted the water in the separating chamber down to the level of its connection therewith.

6. An apparatus for use in connection with the return main or mains of a vacuum steam heating system comprising a gas pump for exhausting the gas from the system, a water pump for withdrawing the water of condensation, and connections for relieving the water pump from gas.

7. A water and air pumping system comprising a receiver for air and water, a pump for withdrawing air from the receiver and a second pump for withdrawing water therefrom, and means for controlling the operation of said pumps governed by the pressure and amount of water in said receiver.

8. A water and air pumping system comprising a receiver for air and water, a pump for withdrawing water from said receiver, a second pump separately connected to said receiver for withdrawing air therefrom, and means for controlling the operation of said pumps governed by the pressure and amount of water in said receiver.

9. A liquid and gas pumping apparatus including in combination, a receiver for liquid and gas, an electric motor, a pumping unit comprising a liquid pump and a gas exhausting pump connected to be operated by said motor, said pumps being disposed at a lower elevation than the normal level of water in said receiver and having their inlets in communication with the receiver, a switch controlling the operation of said motor and means to actuate said switch governed by the amount of liquid in the receiver.

10. A liquid and gas pumping apparatus including in combination, a receiver for liquid and gas, an electric motor, a liquid pump and a gas exhausting pump connected to be operated by said motor and disposed at a lower elevation than the normal water level in said receiver, said pumps having their inlets in communication with the receiver, a switch controlling the operation of said motor and means to actuate said switch governed by the pressure in the receiver, said liquid pump being of a larger capacity than necessary to handle the liquid if run continuously.

11. A liquid and gas pumping apparatus including in combination, a receiver for liquid and gas, an electric motor, a liquid pump and a gas exhausting pump connected to be operated by said motor, said pumps having their inlets in communication with the receiver, a break in the electric circuit to the motor, and means to close said break when the pressure or quantity of liquid in the receiver exceed predetermined amounts.

12. A water and gas pumping apparatus for use in a vacuum steam heating system including in combination, a receiver for water and gas, a pump for withdrawing the water from the receiver, a hydro-turbine pump for exhausting gas from the receiver, and means to supply the hydro-turbine pump with make-up water from water in the receiver.

13. A liquid and gas pumping apparatus including in combination, a receiver for the liquid and gas, a centrifugal pump for withdrawing the liquid from the receiver disposed at a lower elevation than the normal level of water in the receiver, said pump having a liquid pipe connecting its suction chamber with the receiver and a gas pipe affording communication between the top of the suction chamber and the top of the receiver, for the purpose set forth.

14. A liquid and gas pumping apparatus including in combination, a receiver for the liquid and gas, a centrifugal pump for withdrawing liquid from said receiver disposed at a lower elevation than the normal level of water in said receiver, a rotary pump directly connected with said centrifugal pump to exhaust gas from said receiver, and a gas pipe providing communication between the top of the sucton chamber of the centrifugal pump and the top of the receiver, for the purpose set forth.

15. A liquid and gas pumping apparatus including in combination, a receiver for liquid and gas, a centrifugal pump for withdrawing liquid from said receiver disposed at a lower elevation than the normal level of water in said receiver, a rotary pump directly connected with said centrifugal pump to exhaust gas from said receiver, means to control the operation of said pumps governed by the pressure in the receiver, and a gas pipe providing communication between the top of the suction chamber of the centrifugal pump and the top of the receiver, for the purpose set forth.

16. A liquid and gas pumping apparatus for use in a vacuum steam heating system including in combination, a receiver for liquid and gas, a centrifugal pump for withdrawing liquid from said receiver, a liquid-turbine gas pump to exhaust gas from said receiver, means to supply said gas pump with make-up liquid and means to separate out liquid from the gas discharged by the gas pump and return it to the receiver.

17. A liquid and gas pumping apparatus including in combination, a receiver for liquid and gas, a liquid and gas exhausting pump, each having their inlets connected to the receiver, the gas pump being of the hydro-turbine type and disposed at an elevation below the normal water level in the receiver, and a conduit extending from the receiver below said water level to the gas pump to supply make-up water.

18. A liquid and gas pumping apparatus including in combination, a receiver for liquid and gas, a pumping unit comprising a liquid and a gas exhausting pump each having their inlets connected to the receiver, the gas pump being of the hydro-turbine type and the liquid pump being of a capacity greater than necessary to handle the liquid if run continuously, said unit being disposed at an elevation below the normal water level in the receiver, a conduit extending from the receiver below said water level to the gas pump to supply make-up water and means to control the operation of said pumps in accordance with the amount of liquid in the receiver.

19. A liquid and gas pumping apparatus including in combination, a receiver for liquid and gas, a pumping unit comprising a liquid pump and a gas exhausting pump, the gas pump being of the hydro-turbine type and the liquid pump being of the turbine type, said unit being disposed at an elevation below the normal water level in the receiver, a conduit extending from the receiver below said water level to the gas pump to supply make-up water, and a gas pipe providing communication between the top of the suction chamber of the liquid pump and the top of the receiver.

In testimony whereof I affix my signature.

IRVING C. JENNINGS.